June 25, 1968  A. B. CAREL  3,389,538
SAMPLE VAPORIZING APPARATUS
Filed Aug. 9, 1965  2 Sheets-Sheet 1

INVENTOR.
ALFRED B. CAREL
BY
ATTORNEY

INVENTOR.
ALFRED B. CAREL
BY
ATTORNEY

United States Patent Office 3,389,538
Patented June 25, 1968

3,389,538
SAMPLE VAPORIZING APPARATUS
Alfred B. Carel, Ponca City, Okla., assignor to Continental Oil Company, Ponca City, Okla., a corporation of Delaware
Filed Aug. 9, 1965, Ser. No. 478,307
18 Claims. (Cl. 55—386)

ABSTRACT OF THE DISCLOSURE

Sample vaporizing apparatus is provided comprising a continuous conduit in thermal contact with a heated core, and means for introducing a sample at a point intermediate those portions in contact with the core.

---

This invention relates to apparatus for rapidly converting a chemical sample to a gaseous state preparatory to subjecting the sample to analysis, or in some other way, utilizing the sample while it is still in such gaseous state. More particularly, but not by way of limitation, the present invention relates to a sample vaporizing apparatus which is especially well adapted for use in gas chromatography for converting a liquid sample to a gas in a rapid and efficient manner, preparatory to moving the gaseous sample into a chromatographic column.

As is well understood in the fields of analytical and preparative gas-liquid partition chromatography, in order to obtain efficient resolution of the components of a sample introduced to the chromatographic column, it is important that the sample be quickly and completely vaporized preparatory to introduction to the chromatographic column. In systems which utilize an inert carrier gas for sweeping the sample through the column, it is desirable that the sample which is to be resolved into its components be diffused in the carrier gas to the minimum possible extent, or, stated differently, that it be swept into the column by a minimum volume of carrier gas in a relatively short period of time. It is also desirable to achieve efficient vaporization of a liquid sample in order to prevent contamination of samples subsequently introduced to the system via the same route by a portion of the initial sample which was not completely vaporized during a previous analysis or preparation.

The present invention provides an improved sample vaporizing apparatus for rapidly and completely vaporizing relatively large samples while simultaneously entraining the samples in a moving carrier gas stream. The vaporizing apparatus is especially useful for introducing the vaporized sample to a chromatographic column of the type suitable for use in gas-liquid partition chromatography, and most particularly, preparative gas-liquid partition chromatography apparatus utilizing relatively large samples.

Broadly described, the sample vaporizing apparatus of the invention comprises a core which is preferably constructed of a rigid material having good properties of thermal conductivity; a tubular conduit surrounding and contacting said core; means for injecting a sample to be vaporized into the tubular conduit at a point in the conduit between portions thereof which contact the core; and heating means disposed inside of and surrounded by the core. With the described arrangement, an inert carrier gas, such as helium, argon or nitrogen, can be introduced to one end of the tubular conduit, passed through the convolutions of the conduit which surround the heated core, then passed through the portion of the conduit which receives the injected sample to be vaporized, and finally passed through additional convolutions of the tubular conduit which are in contact with the heated core. The effect obtained is to flash or substantially entirely vaporize the sample by reason of the heat imparted to the carrier gas as it passes through the conduit prior to reaching the portion of the conduit into which the sample is injected, and then to retain the carrier gas-vaporized sample mixture in the gaseous state as the mixture moves through the additional convolutions of the coil which surround the heater. The means which is provided for injecting a sample to be vaporized into the tubular conduit can suitably take the form of a T fitting which is capped with a rubber septum, facilitating the injection of a liquid sample into the conduit with a hypodermic syringe, or it may be any other suitable device permitting liquid or, in some instances, sublimable solids to be substantially instantaneously injected into the path of the carrier gas as it moves through the tubular conduit.

In a preferred embodiment of the invention, the heated core is an elongated, generally cylindrical block of copper which is provided with a plurality of spiral or helical grooves around the outer periphery. These grooves accommodate the tubular conduit previously described, and also function to receive an elongated, flexible heating element. The tubular conduit is wrapped around the heated core so that one portion thereof which receives the incoming carrier gas is disposed in every third one of the helical grooves formed on the outside of the core. Adjacent one end of the core, the tubular conduit is connected to a T fitting, or other suitable sample injection element, and this element is also connected to a second portion of the tubular conduit which is wrapped in a second of the helical grooves formed around the outer periphery of the heated core. A third helical groove on the heated core accommodates the elongated, flexible heating element. Thus, a carrier gas and sample moving in the several convolutions of the tubular conduit receive heat from two sources, i.e., from the elongated, flexible heating element which is wrapped around the heated core in one of the helical grooves, and from the heating means which is disposed inside of, and surrounded by, the copper block which constitutes the core. In addition to the described characteristics of a preferred embodiment of the invention, it is further preferred to surround the heated core with an insulating medium, such as magnesia pipe insulation, or any other suitable thermal insulation. Suitable temperature controls are preferably provided to either or both of the heating elements thus provided in the preferred embodiment of the invention.

The described sample vaporizing apparatus functions to substantially instantaneously vaporize a sample injected into the path of flow of the heated carrier gas as it moves in the tubular conduit which surrounds the heated core. No opportunity is provided for recondensation of the sample as it is swept along by the carrier gas toward its ultimate destination.

In yet another aspect, the invention contemplates the inclusion of the novel sample vaporizing apparatus hereinbefore described in combination with a preparative gas-liquid partition chromatography system for the purpose of resolving a mixture of chemicals into its several components, and collecting the components in a relatively pure state.

From the foregoing description of the invention, it will have become apparent that an important object of the invention is to provide an improved sample vaporizing apparatus for use in quickly and efficiently converting a liquid or sublimable solid sample to a vapor, and entraining this vaporized sample in a uniform manner in a moving inert carrier gas.

An additional object of the present invention is to provide a sample vaporizing device which can be accurately controlled with respect to the temperature to which the sample is brought after it has been vaporized.

A further object of the present invention is to provide a sample vaporizing apparatus which is especially well adapted for use in a preparative gas-liquid partition chromatography system for quickly and efficiently vaporizing a sample to be resolved into several components by a chromatographic column.

In addition to the foregoing described objects and advantages, additional objects and advantages will become apparent as the following detailed description of the invention is read in conjunction with the accompanying drawings which illustrate a preferred embodiment of the invention, and a preferred use of the invention in a gas-liquid chromatography system.

Figure 1:
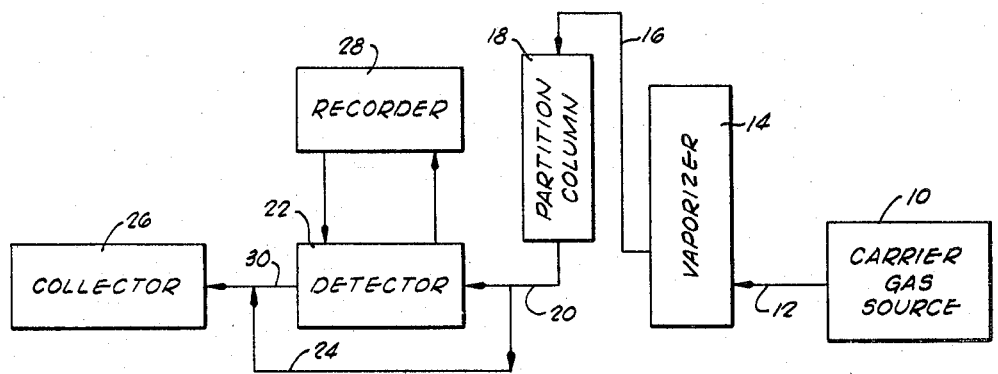
FIGURE 1 is a schematic flow diagram illustrating the manner in which the sample vaporizing apparatus of the invention can be utilized in a gas-liquid partition chromatography system.

Referring now to the drawings in detail, reference will initially be made to FIGURE 1 of the drawings, which illustrates a preferred use of the vaporizing apparatus in combination with certain elements of a gas-liquid partition chromatography system. A source of an inert carrier gas, such as a cylinder of compressed helium, nitrogen or argon, is schematically depicted and is designated by reference character 10. The carrier gas 10 is connected by a suitable conduit 12 to a sample vaporizer 14 which functions to facilitate the injection of a sample into the carrier gas stream, and the conversion of the sample to a gaseous state in a rapid and efficient manner.

The carrier gas stream with the vaporized sample entrained therein is then further directed through a conduit 16 to a chromatographic partition column 18. The function of the chromatographic partition column is to resolve the vaporized sample, which consists of a mixture of several individual components, into the several components so that they may be individually detected and collected in subsequent stages of the system. The partition column will normally contain an adsorbent material of some type, and, in a preferred use of the vaporizer of the invention, is a partition column of the gas-liquid partition type in which the column packing is a solid substrate carrying on the surface of the solid particles, a liquid which selectively adsorbs the several components of the vaporized sample. By reason of such selective adsorption, the speed with which the several components in the vaporized sample mixture can traverse the partition column differs. The components are therefore eluted sequentially from the column following their resolution therein one from the other.

The carrier gas continues to move the several sequentially eluted individual components of the sample through a conduit 20 which connects the discharge end of the partition column 18 to a detector 22. Alternatively, the detector 22 may be by-passed by a conduit 24 in order to direct the components to a collector 26 in which the several components may be individually trapped and recovered in a relatively pure state. Where the detector 22 is employed, its function is to sense the quantity, and, in some instances, the quality, of the several components, and to transmit a signal developed in response to such detection to a recorder 28 which can provide a record of the quantities of the several components of the sample as these are passed in sequence through the detector. From the detector 22, a conduit 30 is provided for directing the several components of the sample while still entrained in the carrier gas into the collector 26 where the individual components are collected and isolated from each other in the manner previously described.

Figure 2:
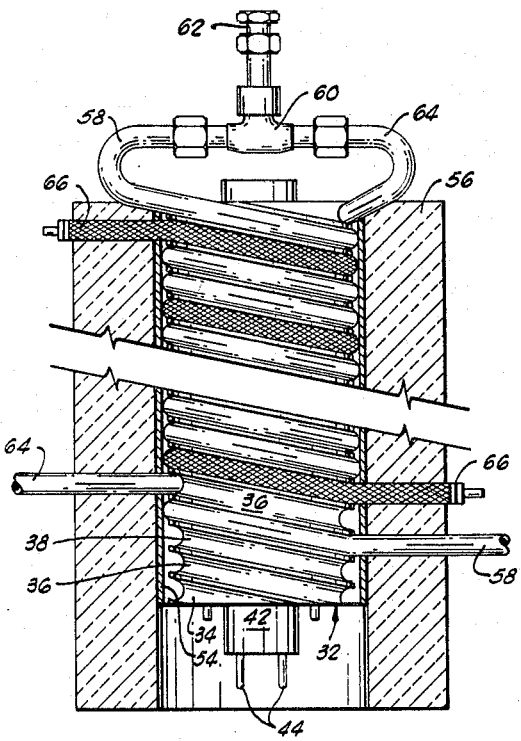
FIGURE 2 is a partial vertical sectional view of the vaporizing apparatus, illustrating the central, heated core in elevation and the insulation surrounding it in section.
Figure 3:
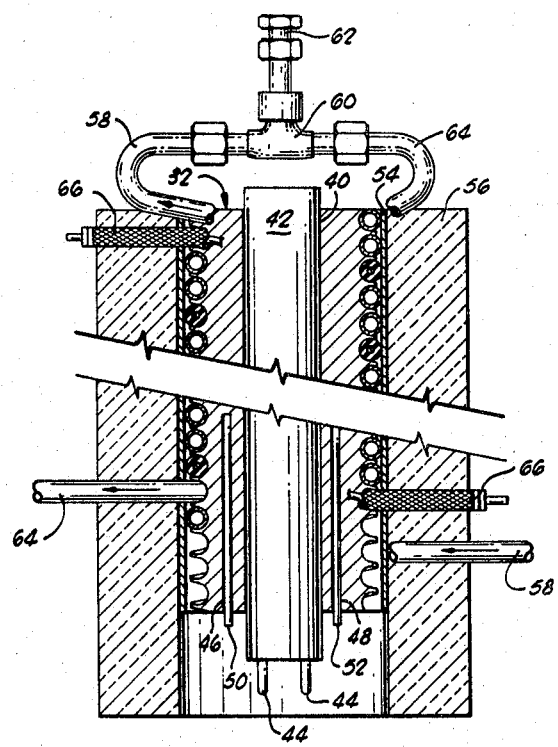
FIGURE 3 is a vertical sectional view taken through the central core of the vaporizing apparatus of the invention as the core is illustrated in FIGURE 2 and continuing to show the insulation surrounding the central core in section.

The vaporizer of the present invention has been found to be especially well adapted for use in the system or combination depicted in FIGURE 1 and hereinbefore described, and its operation will hereinafter be described, by way of example, with particular reference being made to the use of the vaporizer in a gas-liquid chromatographic system of this type. The structure of the novel vaporizer of the invention is illustrated in FIGURES 2 and 3 of the drawings. The vaporizer includes an elongated, generally cylindrical core 32 which is preferably constructed of a rigid material having good thermal conductivity. The most preferred materials of construction are copper and silver, although other materials can, of course, be utilized. The core 32 is provided with three contiguous helical grooves which extend from one end of the core to the other, and are severally designated by reference characters 34, 36 and 38. The pitch of the helical grooves 34, 36 and 38 is not particularly critical, but preferably is relatively flat or shallow so as to provide a substantial number of convolutions over the total length of the core. The depth of each of the grooves 34, 36 and 38 is also not critical, but is preferably such that each groove defines a semicircular arc of about 180°. This arrangement provides for a more efficient heating of coils of a conduit which are positioned in the grooves as hereinafter described.

In the illustrated embodiment of the invention, the core 32 is provided with an axial aperture 40 which extends through the core, and which, as best illustrated in FIGURE 3, receives an elongated, preferably cylindrical heating element 42. The heating element 42 is provided with terminals 44 at one of its ends to facilitate connection of the heating element with a suitable source of electrical power and with a temperature control element (not shown) in accordance with techniques well understood in the art.

The core 32 further includes longitudinally extending apertures 46 and 48 which are radially offset in the core from, and extend parallel to, the axial aperture 40. The apertures 46 and 48 receive a thermocouple 50 and a resistance type sensing element 52, respectively. The thermocouple 50 is connected to a suitable readout device and functions to constantly indicate the temperature of the core 32 to an operator of the apparatus. The resistance type sensing element 52 can suitably be a 100 ohm platinum resistor, and is connected to suitable temperature control means (not shown) which is connected to the heating element 42 and functions to maintain the core 32 at a preselected temperature by intermittently energizing the heating element.

The core 32 is surrounded by a tubular sleeve 54 which is preferably constructed of a thermally conductive metal, such as copper, and which is surrounded by thermal insulation 56. The insulation 56 may be magnesia pipe insulation or any other material which will function to effectively prevent the escape of heat from the sleeve 54 and from the heated core 32 enclosed therein.

For the purpose of effecting the rapid and efficient vaporization of a sample, and the entrainment of the vaporized sample in a carrier gas, a tubular conduit 58 is passed through the insulation 56 and sleeve 54 and is wound in convolutions around the core 32 in one of the contiguous helical grooves, 34, 36 or 38. In the illustrated embodiment, the tubular conduit 58 is shown as being positioned in the helical groove 34. It will be noted that the conduit 58 is wrapped around the core 32 in helical convolutions which extend substantially from one end thereof to the other. At the upper end of the core 32 as it is viewed in FIGURES 2 and 3, the conduit 58 passes off of the end of the core and is then bent through a generally U-shaped configuration to pass across the top of the core where it is connected to a T fitting 60. The T fitting 60 is provided with a suitable inlet 62 which may be covered with a rubber septum (not shown) to facilitate injection of the liquid sample into the T fitting 60 using a hypodermic syringe. Alternatively, the inlet 62 may be connected to other suitable sample introduction apparatus.

A second tubular conduit 64 is connected to the T fitting 60 in line with the tubular conduit 58 and receives the vaporized sample as it is entrained in the moving carrier gas. The tubular conduit 64 is then bent downwardly and inwardly and positioned in a second of the helical grooves on the core 32. In the illustrated construction, the tubular conduit 64 is positioned in the helical groove 36. The conduit 64 thus is positioned in juxtaposition to the conduit 58 and is wound about the core 32 in convolutions which extend from the upper end thereof to a point relatively close to the lower end thereof.

The third helical groove which is formed in the outer periphery of the core 32 (groove 38 in the illustrated embodiment) accommodates an elongated, flexible heating element 66 which is wound about the core. The ends of the elongated, flexible heating element 66 are passed through suitable openings provided in the insulation 56 and the sleeve 54, and are provided with suitable connections to facilitate connection of this heating element to a source of electrical power.

It should be pointed out at this point in the discussion that both the heating element 66 and the heating element 42 can be automatically controlled to impart a selected, predetermined temperature to the core 32, or alternatively, either of the heating element 66 or 42 may be continuously controlled in response to the sensed temperature of the core 32, and the other may be set at a constant temperature which is continuously maintained.

Figure 4:
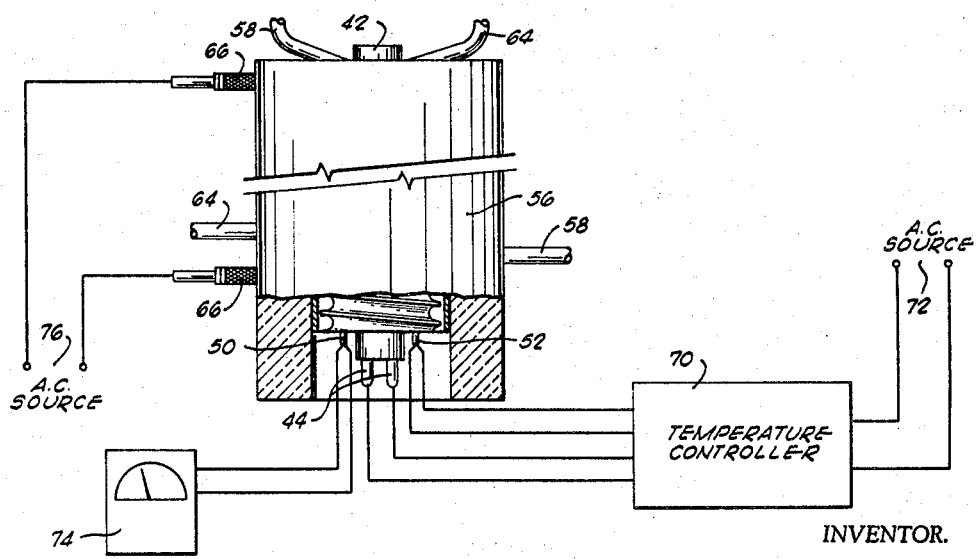
FIGURE 4 is a schematic wiring diagram illustrating one manner in which the heating elements of the vaporizing apparatus of the invention can be connected to a source of electrical energy.

An example of one wiring arrangement which can be utilized in heating the core 32 in a controlled manner is depicted in FIGURE 4 of the drawings. In this arrangement, the heating element 42 is connected through a suitable on-off type temperature controller 70 to a source of electrical power 72. The temperature controller 70 can be set to respond to any temperature level sensed by the sensing element 52 which is connected by suitable electrical leads to the controller. In this way, the temperature of the core 32 can be maintained at a desired value or may be selectively adjusted from time to time.

The thermocouple 50 is depicted as being connected to a meter 74 which constantly indicates the temperature of the core. A continuous recorder could also be connected to the thermocouple to provide a temperature record of an entire vaporization run.

The heating element 66 provides a constant heating effect and derives its power from a suitable source 76.

In the operation of the sample vaporizing apparatus, an inert carrier gas, such as helium, nitrogen or argon, is delivered from a suitable source to the tubular conduit 58. In passing through the conduit 58, the carrier gas is heated by reason of the contact of the conduit with the heated core 32. Thus, as the carrier gas enters the T fitting 60 from the conduit 58, it is heated to a sufficiently high degree to effect the conversion of a liquid or sublimable solid sample to the vapor state. A sample which is injected through the inlet 62 of the T fitting 60 into the stream of carrier gas will thus be flashed substantially immediately to the vapor state, and will be swept into the tubular conduit 64 by the moving carrier gas. It should also be pointed out that the T fitting 60 will itself be heated to a relatively high degree by reason of its connection to the tubular conduits 58 and 64, both of which are highly heated due to their contact with the heated core 32.

As the carrier gas having entrained therein the vaporized sample moves into the tubular conduit 64, the gas is again brought into close proximity to the heated core 32. Thus, no opportunity is provided for the carrier gas to be reduced in temperature, thus permitting recondensation of some of the sample. From the heated core 32, the tubular conduit 64 is passed through the insulation 56, and then is immediately connected to a chromatographic partition column, as illustrated in FIGURE 1, or other device which is to be utilized in the treatment or disposition of the carrier gas having the vaporized sample entrained therein.

The vaporizing apparatus of the invention is especially suited for use with gas-liquid partition chromatography apparatus, since substantially all of the sample is vaporized in a short period of time, and overlap of components as they are eluted from the partition column is thereby avoided. Moreover, contamination of subsequently injected samples is avoided since no residual portion of the preceding samples is permitted to remain in the T fitting 60.

Although a preferred embodiment of the invention has been described in the foregoing discussion and has been illustrated in the drawings in order to provide a clear indication of how the invention may be practiced, it is to be understood that various modifications and innovations may be effected in the described structure and in the materials utilized therein without departure from the basic principles which underlie the invention. For instance, in one embodiment of this device, conduits 58 and 64 may be packed with a permeable, heat conducting packing to increase the heat exchange area encountered by the vapors flowing therethrough. Thus, depending on the composition of such vapors, particulated metals, such as stainless steel, aluminum, and the like, may be placed into the conduits. All such modifications and innovations are therefore intended to be circumscribed by the spirit and scope of the invention except as the same may be necessarily limited by the appended claims or reasonable equivalents thereof.

What is claimed is:

1. Sample vaporizing apparatus comprising:
   a core;
   conduit means contacting said core;
   inlet means in communication with one end of said conduit means for introducing a fluid to be heated;
   means for injecting a sample to be vaporized into said conduit means at a point between portions thereof in contact with said core;
   outlet means in communication with the other end of said conduit means for withdrawing an admixture of vaporized sample and heated fluid; and
   means for heating the body of said core adjacent said conduit means.

2. Sample vaporizing apparatus comprising:
   a core;
   conduit means contacting said core;
   inlet means in communication with one end of said conduit means for introducing a fluid to be heated;
means for injecting a sample to be vaporized into said conduit means at a point between portions thereof in contact with said core;
outlet means in communication with the other end of said conduit means for withdrawing an admixture of vaporized sample and heated fluid; and
heating means carried by the interior of said core.

3. Sample vaporizing apparatus as defined in claim 2 and further characterized to include a heating element extending around said core in juxtaposition to said conduit means.

4. Sample vaporizing apparatus as defined in claim 2 and further characterized to include thermal insulation surrounding and enclosing said core and the portion of said conduit means in contact with said core, said conduit means having a first end portion projecting through said thermal insulation at one end of said core and a second end portion projecting through said thermal insulation at said one end of said core.

5. Sample vaporizing apparatus as defined in claim 2 wherein said means for injecting a sample into said conduit means comprises a T fitting joined to portions of said conduit means in contact with said core.

6. Sample vaporizing apparatus comprising:
a generally cylindrical core;
means for heating said core;
a first tubular conduit wrapped around said core in convolutions extending over a major portion of the core;
inlet means in communication with one end of the first conduit for introducing a fluid to be heated;
a sample injection fitting connected to the other end of said first tubular conduit and positioned adjacent one end of said core;
a second tubular conduit connected at one end to said sample injection fitting and wrapped around said core in juxtaposition to said first tubular conduit;
outlet means in communication with the other end of said second conduit for withdrawing an admixture of vaporized sample and heated fluid; and
thermal insulation means around said core and said first and second tubular conduits.

7. Sample vaporizing apparatus as defined in claim 6 wherein said heating means comprises:
an elongated, flexible heating element extending around said core and in contact therewith.

8. Sample vaporizing aparatus as defined in claim 6 wherein said thermal insulation means comprises:
a rigid metal sleeve surrounding said core and first and second tubular conduits; and
thermal insulation supported by, and surrounding, said rigid metal sleeve.

9. Sample vaporizing apparatus as defined in claim 7 wherein said cylindrical core is peripherally grooved by three contiguous helical grooves,
and wherein said first tubular conduit is positioned in one of said grooves, said second tubular conduit is positioned in another of said grooves and said elongated, flexible heating element is positioned in the third of said grooves.

10. Sample vaporizing apparatus as defined in claim 7 wherein said cylindrical core is axially apertured from one end thereof to the other and said means for heating said core is further characterized to include:
an elongated second heating element positioned in said axial aperture; and
means for continuously sensing the temperature of said core and controlling the energization of at least one of said heating elements in response to the sensed temperature of said core for maintaining the core at a predetermined temperature.

11. Sample vaporizing apparatus as defined in claim 9 wherein said cylindrical core is axially apertured from one end thereof to the other, and said means for heating said core is further characterized to include:
an elongated, second heating element positioned in said axial aperture; and
means for continuously sensing the temperature of said core and controlling the energization of at least one of heat heating elements in response to the sensed temperature of said core for maintaining the core at a predetermined temperature.

12. Sample vaporizing apparatus as defined in claim 11 and further characterized to include:
a rigid metal sleeve surrounding said core and first and second tubular conduits; and
thermal insulation supported by and surrounding said rigid metal sleeve.

13. Sample vaporizing apparatus comprising:
a rigid, cylindrical core having at least three helical, contiguous grooves in the outer periphery thereof, said core having an axially extending aperture therein, and having at least one additional aperture extending parallel to said axially extending aperture and radially offset therefrom in said core;
a first tubular conduit wrapped around said core in one of said grooves;
a second tubular conduit wrapped around said core in a second of said grooves;
sample receiving means interconnecting said first and second tubular conduits and facilitating the introduction of a sample into a stream of inert carrier gas flowing between said first and second tubular conduits;
an elongated, flexible heating element wrapped around said core in a third of said grooves;
a second heating element in said axially extending aperture inside said core;
a temperature sensing element in said additional aperture and adapted for connection through a temperature control device to one of said heating elements;
a rigid metal sleeve surrounding said core and said first and second tubular conduits; and
thermal insulation supported by, and surrounding, said rigid metal sleeve.

14. In combination:
a chromatographic column adapted to resolve a gaseous mixture into its several components;
a source of an inert carrier gas; and
a sample vaporizing device connected between said source of inert carrier gas and said chromatographic column for vaporizing a sample and introducing the vaporized sample to a stream of inert carrier gas flowing from said source to said column, said sample vaporizing device comprising:
a core;
tubular conduit means surrounding and contacting said core;
inlet means in communication with one end of said tubular conduit means for introducing said carrier gas;
means for injecting a sample to be vaporized into said tubular conduit means at a point between portions thereof in contact with said core;
outlet means in communication with the other end of said tubular conduit means for withdrawing an admixture of vaporized sample and carrier gas; and
means for heating substantially the entire body of said core.

15. The combination defined in claim 14 wherein said core is grooved at its outer periphery with a plurality of helical, contiguous grooves extending over a major portion of said core; and
said tubular conduit means includes:
a first tubular conduit wrapped around said core in one of said grooves and connected at one of its ends to said source of inert carrier gas and at its other end to said means for injecting a sample to be vaporized; and a second tubular conduit wrapped around said core in another of said grooves and connected at one of its ends to said chromatographic column and at its other end to said means for injecting a sample to be vaporized.

16. The combination defined in claim 14 and further characterized to include thermal insulation means surrounding said core and tubular conduit means.

17. The combination defined in claim 14 wherein said heating means includes a heating element positioned at least partially inside said core.

18. The combination defined in claim 15 wherein said heating means includes a heating element wrapped around said core in juxtaposition to said first and second tubular conduits.

References Cited
UNITED STATES PATENTS

| | | | |
|---|---|---|---|
| 2,576,558 | 11/1951 | Bede | 219—302 X |
| 3,043,128 | 7/1962 | Ayers | 73—23.1 |
| 3,053,077 | 9/1962 | Tracht | 55—386 |
| 3,174,326 | 3/1965 | Carle et al. | 73—23.1 |
| 3,225,521 | 12/1965 | Burow | 55—197 X |
| 3,290,482 | 12/1966 | Dodd et al. | 73—23.1 |

SAMIH N. ZAHARNA, *Primary Examiner.*

REUBEN FRIEDMAN, *Examiner.*

J. DE CESARE, *Assistant Examiner.*